(12) United States Patent
Suda et al.

(10) Patent No.: US 7,272,711 B2
(45) Date of Patent: Sep. 18, 2007

(54) RECORDING/REPRODUCING APPARATUS AND METHOD FOR UPDATING FIRMWARE OF THE APPARATUS

(75) Inventors: Hajime Suda, Yokohama (JP); Hisahide Hattori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 10/720,536

(22) Filed: Nov. 25, 2003

(65) Prior Publication Data
US 2004/0107418 A1    Jun. 3, 2004

(30) Foreign Application Priority Data
Nov. 29, 2002 (JP) .............................. 2002-348306

(51) Int. Cl.
*G06F 9/44* (2006.01)
*G06F 9/00* (2006.01)

(52) U.S. Cl. ............................. 713/100; 713/1; 713/2; 717/168; 717/172; 717/173

(58) Field of Classification Search .................... 713/1, 713/2, 100; 717/168, 170, 171, 172, 173
See application file for complete search history.

(56) References Cited

U.S. PATENT DOCUMENTS

| 5,968,141 | A | 10/1999 | Tsai |
| 6,049,671 | A | 4/2000 | Slivka et al. |
| 6,484,315 | B1 * | 11/2002 | Ziese ........................ 717/173 |
| 2001/0044933 | A1 | 11/2001 | Tagiri et al. |
| 2002/0138567 | A1 | 9/2002 | Ogawa |
| 2004/0255286 | A1 * | 12/2004 | Rothman et al. ........... 717/168 |
| 2005/0114682 | A1 * | 5/2005 | Zimmer et al. ............. 713/187 |
| 2005/0158100 | A1 * | 7/2005 | Yamaguchi et al. .......... 400/62 |
| 2006/0235949 | A1 * | 10/2006 | Tai et al. .................... 709/219 |

FOREIGN PATENT DOCUMENTS

| JP | 11-65828 | 3/1999 |
| JP | 2002-078036 | 3/2002 |
| WO | WO 01/54406 A1 | 7/2001 |

OTHER PUBLICATIONS

Tanenbaum Andrew S., Computer Networks, 1996, Prentice Hall, Third Ed., pp. 30, 598-600.*
Japanese Office Action dated Jan. 17, 2006 for Appln. No. 2002-348306.
European Search Report dated May 29, 2007 for Appl. No. 03026044.2-1243.

* cited by examiner

*Primary Examiner*—Thomas Lee
*Assistant Examiner*—Mark Connolly
(74) *Attorney, Agent, or Firm*—Pillsbury Winthrop Shaw Pittman, LLP

(57) ABSTRACT

In a recording/reproducing apparatus capable of communicating with a data transmission site and the other apparatus through a network, a control unit controls the recording and reproducing of the information based on firmware. A receiving unit receives first information from the other apparatus through the network, the first information including a request of updating of the firmware. An output unit outputs second information to the data transmission site through the network in response to reception of the first information, the second information including a request of transmitting third information used for updating the firmware. A unit acquires the third information from data transmission site through the network to update the firmware.

11 Claims, 2 Drawing Sheets

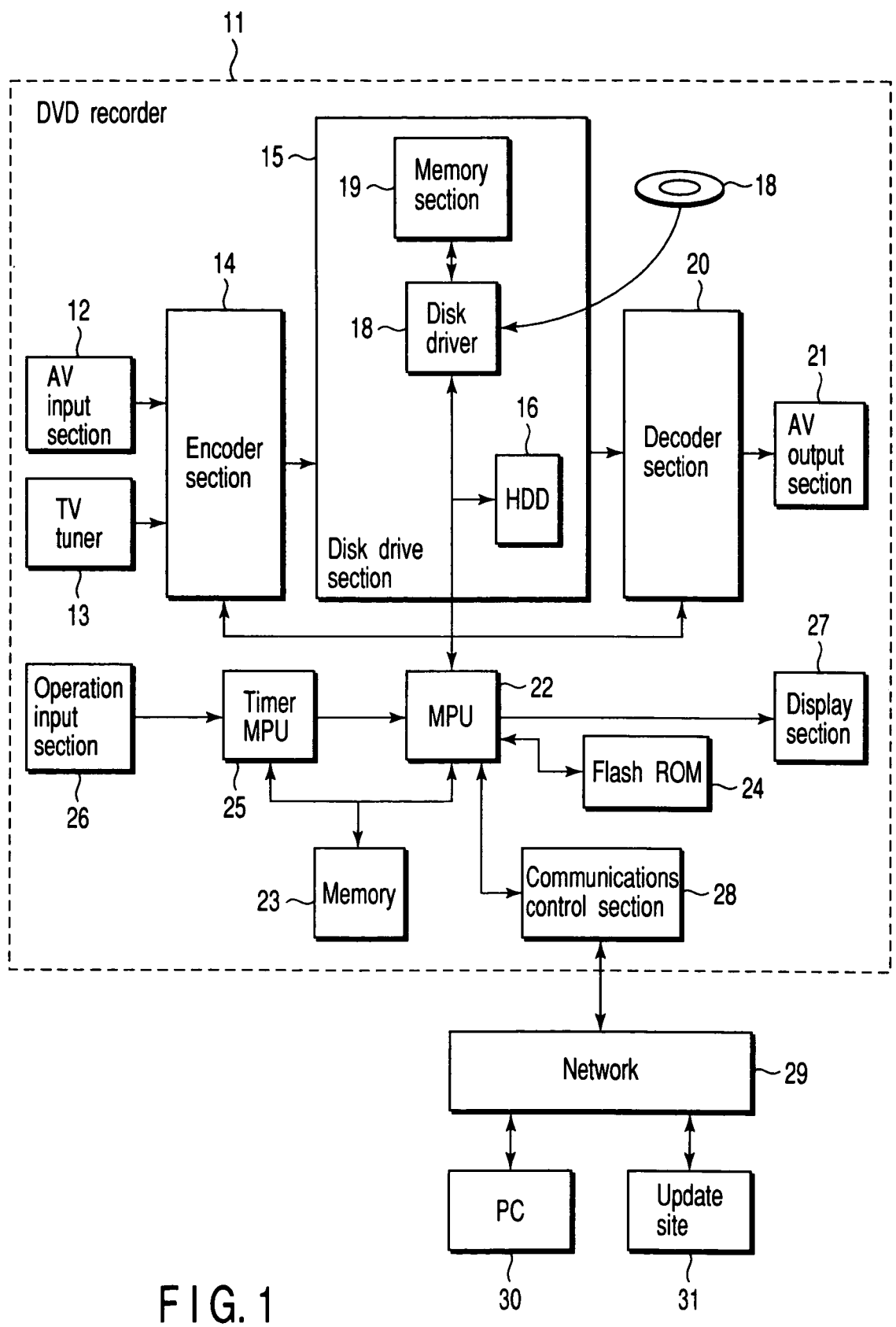
F I G. 1

RECORDING/REPRODUCING APPARATUS AND METHOD FOR UPDATING FIRMWARE OF THE APPARATUS

CROSS-REFERENCE TO RELATED APPLICATIONS

This application is based upon and claims the benefit of priority from the prior Japanese Patent Application No. 2002-348306, filed Nov. 29, 2002, the entire contents of which are incorporated herein by reference.

BACKGROUND OF THE INVENTION

1. Field of the Invention

The present invention relates to a recording/reproducing apparatus used for recording information in a recording medium (e.g., an optical disk) and reproducing the information therefrom, and also to a method that enables updating of the firmware the recording/reproducing apparatus uses.

2. Description of the Related Art

In recent years, so-called DVD recorders have come into wide use. DVD recorders record information in writable disks, such as a DVD-RAM (Digital Versatile Disk-Random Access Memory) or a DVD-R (Digital Versatile Disk-Recordable), and reproduce information from such disks.

The DVD recorders can be upgraded by updating the firmware they use. The process for updating the firmware is as follows:

To update the firmware, the user makes access to an update site, using his or her PC (personal computer), and downloads the necessary update data into the PC. The update data is transferred from the PC to a DVD recorder by use of a dedicated updating application. The firmware of the DVD recorder is updated, using the update data transferred from the PC.

The update process described above has problems in that the PC has to be installed with the dedicated updating program beforehand. Hence, updating the firmware of the DVD decoder may be complicated or time-consuming to the user.

Jpn. Pat. Appln. KOKAI Publication No. 11-65828 discloses a technology wherein information about applications requiring updating is exchanged between a client and a server by use of a simple authentication file so that the applications the client possesses can be updated on the basis of the information sent from the server.

It should be noted that what Jpn. Pat. Appln. KOKAI Publication No. 11-65828 discloses is a technique of updating an application of the client PC on the basis of the information sent form the server. The publication does not describe anything suggestive of an invention wherein a PC upgrades an AV (Audio Visual) device on the basis of information available from an update site.

BRIEF SUMMARY OF THE INVENTION

Accordingly, an object of the present invention is to provide a recording/reproducing apparatus and a method that enable firmware to be easily updated on the basis of update information acquired from a network.

According to an aspect of the invention, there is provided a recording/reproducing apparatus configured to record information in a recording medium and reproduce the information from the recording medium based on firmware, the recording/reproducing apparatus comprising: a unit configured to receive first information from a network, the first information being information requesting updating of the firmware, an output unit configured to output second information to the network in response to reception of the first information, the second information being information requesting third information used for updating the firmware; and a unit configured to acquire the third information from the network.

According to another aspect of the present invention, there is provided a recording/reproducing apparatus configured to record information in a recording medium and reproduce the information from the recording medium based on firmware, the recording/reproducing apparatus comprising: a unit configured to receive first information from a network, the first information being information requesting an update page data of the firmware, a first output unit configured to output second information to the network in response to reception of the first information, the second information being used for requesting the update page data, a unit configured to acquire the update page data from the network, a unit configured to output the update page data through the network to a transmitter from which the first information is transmitted, a unit configured to receive third information from the network, the third information being information used for requesting update data, a second output unit configured to output fourth information to the network in response to reception of the third information, the fourth information being information used for requesting the update data; and a unit configured to acquire the update data from the network.

According to another aspect of the present invention, there is provided a method which is applied to a recording/reproducing apparatus configured to record information in a recording medium and reproduce the information from the recording medium based on firmware, and which updates the firmware, the method comprising: receiving first information from a network, the first information being information requesting updating of the firmware, outputting second information to the network in response to reception of the first information, the second information being information requesting third information used for updating the firmware; and acquiring the third information from the network.

According to another aspect of the present invention, there is provided a method which is applied to a recording/reproducing apparatus configured to record information in a recording medium and reproduce the information from the recording medium based on firmware, and which updates the firmware, the method comprising: receiving first information from a network, the first information being information requesting an update page data of the firmware, outputting second information to the network in response to reception of the first information, the second information being used for requesting the update page data, acquiring the update page data from the network, outputting the update page data through the network to a transmitter from which the first information is transmitted, receiving third information from the network, the third information being information requesting update data, outputting fourth information to the network in response to reception of the third information, the fourth information being information requesting the update data; and acquiring the update data from the network.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically illustrating a DVD recorder according to one embodiment of the present invention.

DETAILED DESCRIPTION OF THE INVENTION

Figure 2:
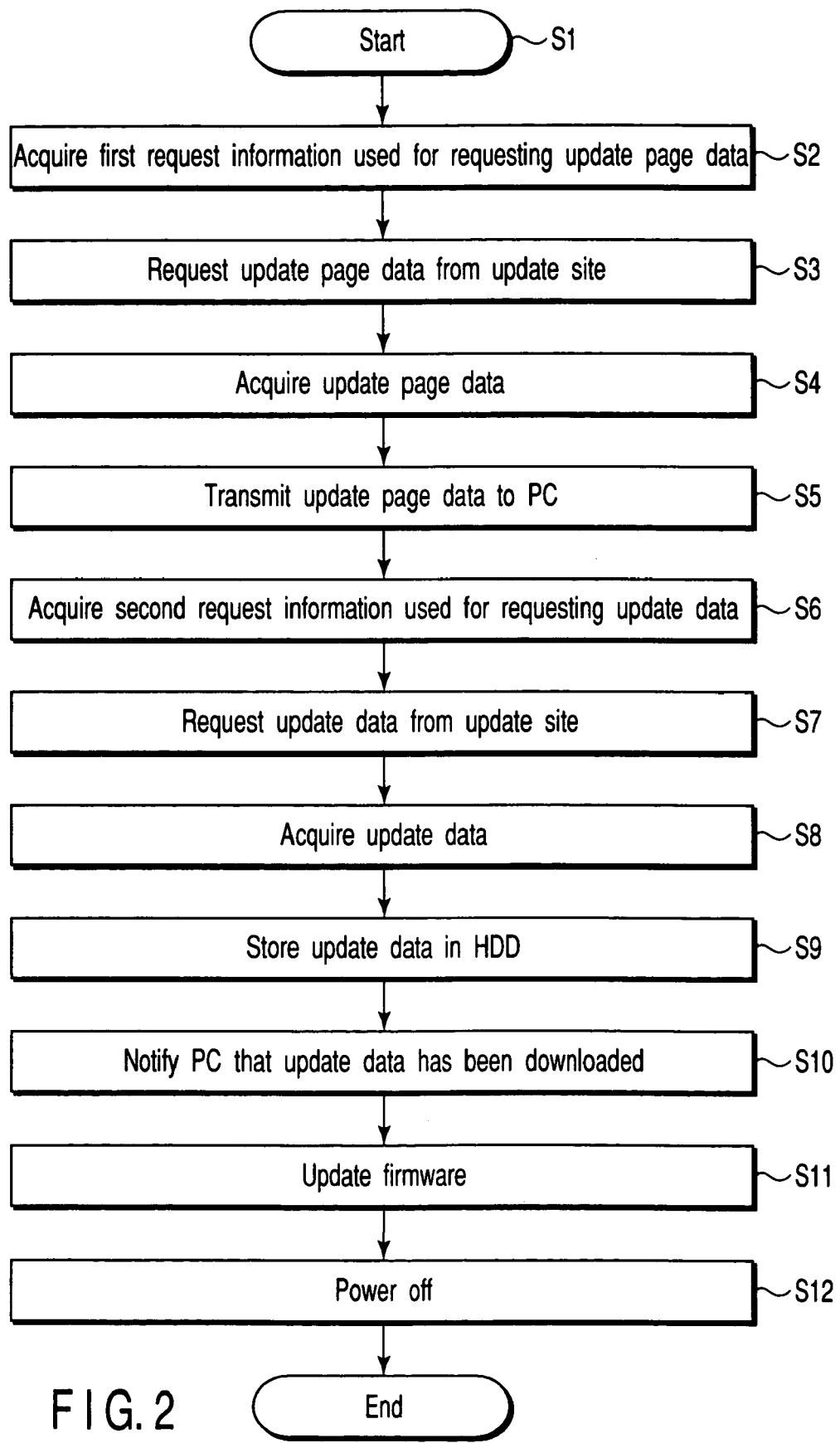
FIG. 2 is a flowchart showing how the firmware of the DVD recorder shown in FIG. 1 is updated.

A recording/reproducing apparatus according to an embodiment of the present invention will be described in detail with reference to the accompanying drawings.

FIG. 1 shows a DVD recorder 11 serving as a recording/reproducing apparatus. As FIG. 1 shows, the DVD recorder 11 comprises an AV input section 12 and a TV (television) tuner 13. External video and audio data are input to the AV input section 12. The TV tuner 13 selects a predetermined channel from television broadcast signals. The TV tuner 13 acquires video and audio data that are broadcast on the selected channel.

The AV input section 12 and the TV tuner 13 output the acquired video and audio data to an encoder section 14. With respect to the input video and audio data, the encoder section 14 performs various kinds of processing, such as compressive encoding, modulation, and the addition of an error correction code, so that the processed data has a format suitable for recording. After being processed in this manner, the data is output to a disk drive section 15.

In the disk drive section 15, the video and audio data output from the encoder section 14 is first recorded in an HDD (Hard Disk Drive) 16. Thereafter, the disk drive section 15 outputs the video and audio data from the HDD 16 to a disk driver 17.

The disk driver 17 temporarily stores video and audio data output from the HDD 16 in a memory section 19 serving as a buffer. An optical disk 18, such as a DVD-RAM or a DVD-R, can be set on the disk driver 17. The disk driver 17 records the video and audio data, which are temporarily stored in the temporary recording section 19, in the optical disk 18 while simultaneously rotating the set optical disk 18. Furthermore, the video and audio data which the disk driver 17 reads out from the optical disk 18 are output from the disk drive section 15 to a decoder section 20.

With respect to the video and audio data output from the disk drive section 15, the decoder section 20 performs various kinds of processing, including decoding, demodulation and error correction. The processed data is output to an AV output section 21. From the AV output section 21, the data output from the decoder section 20 is supplied to a device external of the DVD player 11.

MPU (Micro Processing Unit) 22 controls the recording and reproducing operations performed for the optical disk 18. MPU 22 controls the units of the DVD recorder 11 on the basis of the control software stored in a memory 23, the firmware stored in a flash ROM (Read Only Memory), etc. This control enables the DVD recorder 11 to operate in accordance with the operation information supplied to the MPU 22 from an operation input section 26 through a timer MPU 25. The memory 23 provides a work area for MPU 22 and includes a storage area in which various kinds of setting data (e.g., programming data) are stored. The timer MPU 25 measures time so that a recording operation can be performed on the basis of the programming data stored in the memory 23. The timer MPU 25 generates information based on which an instruction for starting a recording operation or stopping it is supplied to the MPU 22. MPU 22 controls a display section 27 to display a present operating condition and various setting states.

A communications control section 28 is connected to MPU 22 and is connectable to an external network 29, such as the Internet. The communications control section 28 transmits the data or commands output from MPU 22 to the network 29. Also, the communications control section 28 receives information such as content data and commands from the network 29 and sends the received the information to MPU 22.

The network 29 permits a PC 30 to be connected to an update site 31. The PC 30 is owned and operated by the user of the DVD recorder 11. The update site 31 provides update data used for updating the firmware stored in the flash ROM 24 of the DVD recorder 11.

To update the firmware of the DVD recorder 11, the user operates the PC 30 to transmit first request information for requesting update page data to the network 29. The first request information is transferred to the DVD recorder 11 through the network. The update page data includes a guide menu (guide information) under the guidance of which update data used for updating the firmware is downloaded.

When the first request information reaches the DVD recorder 11 through the network 29, the communications control section 28 detects it. The communications control section 28 notifies MPU 22 of this detection, and MPU 22 starts updating the firmware in response to the detection in step S1 of FIG. 2. In step S2, MPU 22 causes the communications control section 28 to acquire the first request information.

In step S3, MPU 22 adds recorder model information to the first request information and causes the communications control section 28 to transmit the resultant first request information to the network 29. The first request information is addressed to the update site 31. As a result, the update site 31 is requested to provide an update page data. Upon receipt of the first request information, the update site 31 provides an update page data corresponding to the recorder model information added to the first request information to the corresponding DVD recorder 11 through the network 29.

In step S4, MPU 22 causes the communications control section 28 to acquire the update page data in the DVD recorder 11. Then, in step S5, MPU 22 causes the communications control section 28 to transmit the acquired update page data to the PC 30 through the network 29. In response to the acquisition of the update page data transferred from the DVD recorder 11, the PC 30 displays update page corresponding to the update page data. When the user requests updating based on the update page, the user operates the PC 30 to transmit the second request information for requesting the update data to the network 29. The second request information is transferred to the DVD recorder 11 through the network 29.

In step S6, MPU 22 causes the communications control section 28 to acquire the second request information transmitted from the PC 30. Subsequently, in step S7, MPU 22 adds specific information, i.e., identification code for identifying the DVD recorder 11 to the second request information and causes the communications control section 28 to transmit the resultant second request information to the update site 31 by way of the network 29. As a result, in step S7, the update site 31 is requested to provide update data. Upon receipt of the second request information, the update site 31 refers to the specific information added to the second request information and determines that the DVD recorder 11 is a device entitled to receive the update data. The update site 31 transmits the update data to the DVD recorder 11 by way of the network 29.

In step S8, MPU 22 causes the communications control section 28 to acquire the update data from the update site 31 through the network 29. In step S9, MPU 22 stores the acquired update data in the HDD 16. Then, in step S10, MPU 22 generates notice information indicating the end of the downloading of the update data, and causes the communication control section 28 to transmit the notice information to the PC 30 by way of the network 29. In response to the acquisition of the notice information, the PC 30 informs the user that the downloading of the update data has ended.

In step S11, MPU 22 updates the firmware stored in the flash ROM 24 on the basis of the update data stored in the HDD 16. After the end of this updating process, MPU 22 turns off the DVD recorder 11 in step S12.

The DVD recorder 11 of the above embodiment comprises the communications control section 28 that is connectable to the network 29. It receives the update data from the update site 31 directly from the network, i.e., without the PC 30 being used for connection to the network. On the basis of the update data, the DVD recorder 11 updates its firmware. As can be seen from this, no dedicated updating application has to be installed on the PC 30 so as to transfer the update data to the DVD recorder 11. On the basis of the update data acquired from the update site 31 through the network, the firmware can be updated easily.

As explained in connection with step S7, MPU 22 adds its specific information to the second request information when it requests the update site 31 to provide update data. On the basis of the specific information, therefore, the update site 31 can determine whether or not a device entitled to receive the update data makes the update request. In this manner, the update data is prevented from being downloaded illegally.

As explained in connection with step S2, MPU 22 adds its model information to the first request information when it requests the update site 31 to provide an update page data. Therefore, the update site 31 can provide the PC 30 with an update page data corresponding to the model of the DVD recorder 11. On the basis of this update page data, the PC 30 requests that update data be downloaded from the update site 31. Hence, the update site 31 is requested to download appropriate update data corresponding to the model of the DVD recorder 11. In this manner, the appropriate update data corresponding to the model can be downloaded to the DVD recorder 11.

Although the firmware of the DVD recorder 11 is updated in the embodiment described above, this in no way restricts the present invention. The present invention has a wide range of application. For example, the present invention is applicable to the updating of the firmware of those devices that use a magnetic disk, a magnetic tape, a semiconductor memory, etc. to record or reproduce video and audio data.

Moreover, the network 29 is not limited to the Internet; it may be a LAN (Local Area Network) or any other communications network desired.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording/reproducing apparatus configured to record information in a recording medium and reproduce the information from the recording medium, the apparatus being capable of communicating with a data transmission site and an other apparatus through a network, the recording/reproducing apparatus comprising:
    a control unit configured to control the recording and reproducing of the information based on firmware;
    a receiving unit configured to receive first information from the other apparatus through the network, the first information including a request of updating the firmware;
    an output unit configured to output second information to the data transmission site through the network in response to reception of the first information, the second information includes a request for transmitting third information used for updating the firmware; and
    a unit configured to acquire the third information from data transmission site through the network to update the firmware.

2. A recording/reproducing apparatus according to claim 1, wherein the output unit adds specific information for identifying the recording/reproducing apparatus to the second information.

3. A recording/reproducing apparatus according to claim 1, further comprising:
    a unit configured to supply fourth information indicating end of acquisition of the third information to the other apparatus through the network.

4. A recording/reproducing apparatus configured to record information in a recording medium and reproduce the information from the recording medium, the apparatus being capable of communicating with a data transmission site and an other apparatus through a network, said recording/reproducing apparatus comprising:
    a control unit configured to control the recording and reproducing of the information based on firmware;
    a receiving unit configured to receive first information from the other apparatus through the network, the first information including a request to update page data;
    a first output unit configured to output second information to the data transmission site through the network in response to reception of the first information, the second information include a request for transmitting the update page data;
    a unit configured to acquire the update page data from the data transmission site through the network;
    a unit configured to transfer the update page data to the other apparatus through the network;
    a unit configured to receive third information from the other apparatus through the network, the third information includes a request of updating for the firmware;
    a second output unit configured to output fourth information to the data transmission site through the network in response to reception of the third information, the fourth information includes a request for transmitting fifth information used for updating the firmware; and a unit configured to acquire the fifth information from the data transmission site through the network.

5. A recording/reproducing apparatus according to claim 4, wherein the first output unit adds model information for indicating the model of the apparatus to the second information.

6. A recording/reproducing apparatus according to claim 4, wherein the second output unit adds specific information for identifying the apparatus to the fourth information.

7. A recording/reproducing apparatus according to claim 4, further comprising:

a unit configured to output fifth information indicating end of acquisition of the update data through the network to the other apparatus.

8. A method which is applied to a recording/reproducing apparatus configured to record information in a recording medium and reproduce the information from the recording medium based on firmware, and which updates the firmware, said method comprising:

receiving first information from a network, the first information being information requesting an update page data of the firmware;

outputting second information to the network in response to reception of the first information, the second information being used for requesting the update page data;

acquiring the update page data from the network;

outputting the update page data through the network to a transmitter from which the first information is transmitted;

receiving third information from the network, the third information being information requesting update data;

outputting fourth information to the network in response to reception of the third information, the fourth information being information requesting the update data; and acquiring the update data from the network.

9. A method according to claim 8, wherein model information is added to the second information.

10. A method according to claim 8, wherein specific information is added to the fourth information.

11. A method according to claim 8, further comprising outputting information indicating end of acquisition of the update data to the transmitter from which the first information is transmitted, the information being sent to the transmitter by way of the network.

* * * * *